June 22, 1954  W. J. HUSHLEY  2,681,861
GLASS FOR EMBEDDING ZINC SULFIDE PHOSPHORS
Filed Dec. 12, 1950
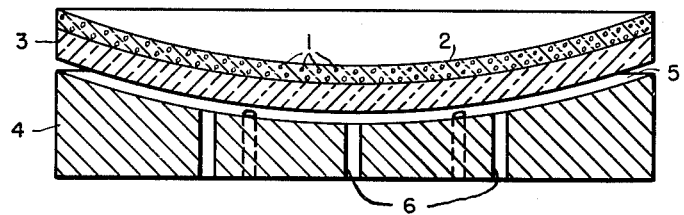
WITNESSES:
E. A. M°Closkey.
Nw. le. Groome
INVENTOR
Walter J. Hushley.
BY
F. W. Lyle.
ATTORNEY Patented June 22, 1954

2,681,861

UNITED STATES PATENT OFFICE 2,681,861

GLASS FOR EMBEDDING ZINC SULFIDE PHOSPHORS

Walter J. Hushley, Pittsburgh, Pa., assignor to Westinghouse Electric Corporation, East Pittsburgh, Pa., a corporation of Pennsylvania Application December 12, 1950, Serial No. 200,367

5 Claims. (Cl. 106—54)

My invention relates to screens presenting extended areas of phosphors such as zinc sulphide. For practical reasons the phosphor in such screens must be present in a thin layer, and where such phosphor layers are deposited on conventional support plates, their surface is not very smooth, but shows considerable roughness and irregularity. This invention relates to screens of this type which must have extremely smooth surfaces, approaching that of plate glass. It is also of value for phosphor screens which are to be positioned in enclosures which contain alkali vapors or other substances likely to deleteriously affect the radiative properties of the screens. To give one illustration, image intensifier tubes are described in Hunter and Longini application, Serial No. 771,112, filed August 28, 1947 (now Patent No. 2,555,545, June 5, 1951), for an Image Intensifier, which contains a fluorescent (i. e. phosphor) screen bearing a photo-electric surface containing alkali metal at one end and a second phosphor screen at its other end. My invention is applicable to the former screen. This application is a continuation-in-part of my application, Serial No. 101,963, filed June 29, 1949 (now Patent No. 2,573,200, October 30, 1951), for a Glass for Embedding Zinc Sulphide Phosphors and assigned to my present assignee.

One object of my invention is to form a self-supporting non-porous thin glass plate, at least one surface of which is glossy smooth, and which contains particles of a phosphor such as zinc sulphide embedded in a matrix of glass.

Another object is to protect phosphors from deleterious effects of environing atmospheres by coating their particles with glass.

Another object is to form a phosphor screen in which the phosphor is protected by being embedded in a glass coating.

Still another object is to provide a method of embedding particles of an X-ray phosphor such as zinc sulphide in a matrix of transparent glass in which they are completely enclosed beneath the glass surface.

Still another object of my invention is to provide a novel kind of protective matrix for particles of phosphor.

A still further object of my invention is to provide a novel glass.

A still further object of my invention is to produce a glass which is fluid enough down to 600° C. but preferably at 680° C. to flow around or envelop particles of phosphors such as zinc sulphide and the like of around 20 microns' diameter, yet be hard enough at the temperatures used to out-gas vacuum containers so that it does not sag or form blisters.

Other objects of my invention will become evident upon reading the following description taken in connection with the drawing, the figure of which shows in cross-section a phosphor screen made in accordance with the principles of my invention. The preferred mode of making such a screen is described in more detail in my application, Serial No. 200,368, filed December 12, 1950, for Fluorescent Screen of a Phosphor Glass filed concurrently herewith.

Referring to the drawing, the completed phosphor screen embodying the principles of my invention comprises particles 1 of a phosphor such as zinc sulphide, calcium tungstate, cadmium tungstate, barium lead sulphate or zinc cadmium sulphide embedded in a matrix 2 of glass, the latter preferably completely covering the tops of the phosphor particles and having a smooth glossy surface. The under surface of the glass is preferably smooth also, and the entire composite sheet non-porous.

The following description applies specifically to the making of a fluorescent screen for an X-ray image intensifier tube such as that described in the above-entitled application of Hunter and Longini, but the same methods may be applied to fluorescent screens for other uses.

The screen herein described is above six inches in diameter and in the shape of a watch glass with a radius of curvature of about ten inches. The support or backing 3 of the fluorescent layer is glass having a coefficient of thermo-expansion between 7 and 10 microinches per inch per degree centigrade. The thickness of the glass backing 3 is preferably from 0.04 to 0.06 inch, such units consisting of soda lime glass being readily available because it is used for lantern slides. However, thicknesses ranging from 0.02 to 0.25 inch have been used successfully in accordance with the methods herein described. Clear and white opaque commercial glasses other than soda lime glasses have also been used. The glass in which the phosphor is embedded is much faster melting than the supporting glass. If the phosphor to be used is a zinc sulphide X-ray phosphor, the phosphor particles are preferably 20 microns in diameter, although other sizes are within the scope of my invention.

For image tube purposes there should be no excess glass, at least the excess glass thickness should be small compared to the total thickness. The glass should be from .001 cm. to 0.05 cm.

above and below the tips of the phosphor particles. However, screens can be made with an excess glass layer above or below, or above and below the phosphor layer.

The embedding glass as above-described is ground to a powder capable of passing through a sieve having 100 to 200 meshes per inch, preferably 150 mesh. It is then mixed with approximately equal weight of an X-ray phosphor powder such as zinc sulphide which has particle sizes averaging about 20 microns. This mixture is then deposited evenly to a thickness of about 100 mg. per square centimeter on a supporting glass which appears at 3 in the drawing. This supporting glass may at the outset have the form of a flat disc six inches in diameter and about 0.05 inch thick. The deposited powder is then made smooth by pressing it or by rolling a cylinder over it. The flat glass disc with the smooth layer above described is then placed on a metal support 4 as shown in the drawing. The support 4 is of cast iron and, for making screens of the watch glass form, its upper surface 5 is concave upwards with a radius of curvature approximately the same as desired for the finished fluorescent screen, that is to say in this case, a radius of about ten inches. The support 4 may have perforating holes or grooves 6 to permit escape of the atmosphere from under the supporting glass when the latter is heated in the furnace. The metal support is preferably preheated in an oven to a temperature of 200 to 450° C. before the glass disc is placed upon it. The support and disc are then placed in an oven and the temperature is raised until the glass powder melts and envelopes the phosphor powder to form a reasonably smooth glassy layer of phosphor embedded in glass as shown. As a result of this heating, the glass disc 3 may sag and conform to the curvature of the surface 5. For commercial soda lime glass discs such as are used in lantern slides and for the embedding glasses mentioned above, a temperature of 680° maintained for about half an hour will both embed the phosphor and properly shape the supporting glass.

The glass used in the foregoing procedure will now be described. The compositions of the glasses are those calculated from the ingredients used to make the glass. The ingredients may be various compounds such as carbonates, borates or silicates and may lose water and carbon dioxide during the melting of the glass. A calculated metal oxide content of the glass actually refers to the content of the batch ingredients before the glass is made and assumes that associated volatile compounds like water and carbon dioxide are eliminated. For example, the boric oxide content is calculated from such ingredients as boric acid, borax and aluminum borate.

The glasses described are made by heating the ingredients which would yield the calculated composition in a crucible at 1050° C. for a period of from 2 to 5 hours. However, other temperatures and times may be used. The glass is then poured out, cooled and ground to a powder to pass a 100-mesh sieve. The powder is then mixed with an approximately equal weight of a ZnS X-ray phosphor and the mixture deposited on a glass plate such as a commercial lantern slide to a total thickness of about 100 mg./cm.$^2$. This preparation is then heated for about half an hour at a temperature between 600° C. and 800° C.

The formulas for the compositions are all given in weight per cent. When a weight per cent is given, it usually refers to the calculated weight of the entire glass and not just of some part of it. The term "alkali content" or "alkali compounds" refers specifically to the nine compounds—lithium, sodium and potassium oxides, fluorides and chlorides. When a given alkali compound is said to form, say, one third of the alkali content of the glass it is meant that as calculated from the batch ingredients of the nine alkali metal oxides and halides mentioned above, one third by weight is the given one and two thirds by weight are the remaining eight. While the use of all nine alkali compounds is illustrated in the examples, in practice there is little to gain by using more than the following four—lithium, sodium and potassium oxides and sodium fluoride. Also it is preferable to use a mixture of the alkali compounds rather than any single one only. A preferred mixture is approximately equal weights of $Na_2O$ and $K_2O$ with a somewhat smaller amount of either $Li_2O$ or NaF or both.

High melting materials such as $Al_2O_3$, MgO, CaO, BeO, BaO, and ZnO are used in the glass to increase its chemical durability and hardness at outgassing temperatures. A mixture of the components is preferred over the use of any one exclusively. Other materials in addition to those listed above may be used. The following have been substituted for alumina in quantities up to five percent of the glass: $ZrO_2$, $TiO_2$ SrO, $As_2O_3$, $CaF_2$, $MgF_2$, $P_2O_5$ and $AlPO_4$. Aluminum phosphate and other phosphates generally produce opalescence unless some alkali earth oxides are also present in the glass. Not all the materials listed are suitable for making glass in which sulphide-type phosphors are to be embedded. Some are not available commercially in sufficiently pure form. For these reasons they are omitted in the examples given below.

Glasses which have the properties outlined above and which may be used for embedding inorganic phosphors such as zinc sulphide, can be made according to the formula given below.

(a) Boric oxide, $B_2O_3$, 55 to 80 percent by weight.

(b) Silica, $SiO_2$, 10 to 25 percent by weight.

(c) Alumina, $Al_2O_3$, 2 to 12 percent by weight. For alumina one may substitute ZnO and up to about 6 percent with MgO and BaO and for MgO up to about 3 percent with BeO and CaO.

(d) Sodium oxide and fluoride, $Na_2O$ and NaF, 5 to 15 percent. For sodium fluoride one may substitute $K_2O$ provided it does not exceed two-thirds of the alkali content. For $K_2O$ one may substitute $Li_2O$ provided it does not exceed one-half of the alkali content and also NaCl, KCl, KF, LiF and LiCl provided these five together do not exceed one-third of the alkali content. Furthermore, the minimum alkali content shall be at least equal in weight to twice the BeO and CaO plus the MgO and BaO plus one-half the alumina and ZnO plus one-third any silica content in excess of 10 percent of the glass and at least one-third of the alkali content shall be $Li_2O$, $Na_2O$ and $K_2O$. Also it is preferred that $Na_2O$ alone does not exceed four-fifths of the alkali content. A preferred mixture of alkali compounds is one in which $Na_2O$ forms about one-half the mixture, $K_2O$ about one quarter and either $Li_2O$ or NaF the remaining quarter.

(e) To any glass having the components and relative proportions given in IV(a), (b), (c), (d) one may add germanium oxide, GeO₂, until about 25 percent of the glass is GeO₂ and the resulting new glass will have approximately the same viscosity characteristics as before the germanium oxide was added. Example No. 2 illustrates the addition of GeO₂ to Example No. 1.

| No. | 1 | 2 | 3 | 4 | 5 | 6 | 7 | 8 |
|---|---|---|---|---|---|---|---|---|
| Comp: | | | | | | | | |
| $B_2O_3$ | 55 | 44 | 66 | 60 | 80 | 60 | 70 | 75 |
| $SiO_2$ | 20 | 16 | 20 | 25 | 10 | 15 | 14 | 15 |
| $Al_2O_3$ | 10 | 8 | 3 | 3 | 3 | 6 | | 2 |
| MgO | | | 2 | | | 3 | 6 | 2 |
| BeO | | | | 2 | | 2 | | |
| $Li_2O$ | | | 2 | 4 | 2 | 3 | | 3 |
| $Na_2O$ | 5 | 4 | 5 | 4 | 3 | | 6 | 3 |
| $K_2O$ | 5 | 4 | 2 | 4 | | 7 | 5 | |
| NaF | 5 | 4 | | | | | 4 | |
| $GeO_2$ | | 20 | | | | | | |

For the purposes described in the first paragraph hereof, I have found preferable results to be attained by glass No. 3.

In the following claims all percentages are by weight as if only the pure compounds listed were used in the glass melt and exclusive of any water and carbon dioxide which may in practice be associated with them.

I claim as my invention:

1. A glass which is of a fired reaction product of a mixture which consists essentially of 55% to 80% $B_2O_3$, 10% to 25% $SiO_2$, 2% to 12% material drawn from the group consisting of $Al_2O_3$, and MgO, the MgO being not over 6% of the combined mixture, 5% to 15% of material drawn from the group which consists of $Na_2O$ and NaF and 0% to 25% of $GeO_2$, all said percentages being by weight.

2. A glass as defined in claim 1, in which there is substituted for part of the MgO an amount up to 3% by weight of the combined mixture drawn from the group which consists of BeO and CaO.

3. The glass defined in claim 1, in which for NaF there is substituted $K_2O$ in an amount up to two-thirds of the alkali content.

4. The glass defined in claim 3, in which $Li_2O$ is substituted for part of the $K_2O$ which does not exceed one-half the alkali content.

5. The glass defined in claim 3, in which there is substituted for part of the $K_2O$ material drawn from the group which consists of NaCl, KCl, KF, LiF and LiCl in an amount such that the last mentioned material does not exceed one-third of the alkali content of the glass, it being provided further that the minimum alkali content shall be at least equal in weight to twice the MgO plus one-half the $Al_2O_3$ plus one-third of any $SiO_2$ in excess of 10% by weight of the glass, it being further provided that at least one-third of the alkali content shall be a material drawn from the group consisting of $Li_2O$, $Na_2O$ and $K_2O$.

References Cited in the file of this patent

UNITED STATES PATENTS

| Number | Name | Date |
|---|---|---|
| 2,523,264 | Armistead | Sept. 26, 1950 |
| 2,573,200 | Hushley | Oct. 30, 1951 |